(12) United States Patent
Santini

(10) Patent No.: US 6,985,330 B2
(45) Date of Patent: Jan. 10, 2006

(54) HIGH EFFICIENCY SIDE-BY-SIDE THIN FILM HEAD UTILIZING CANTED SHIELD YOKES

(75) Inventor: Hugo A. E. Santini, San Jose, CA (US)

(73) Assignee: Hitachi Global Technologies Netherlands B.V., (NL)

( * ) Notice: Subject to any disclaimer, the term of this patent is extended or adjusted under 35 U.S.C. 154(b) by 178 days.

(21) Appl. No.: 10/628,861

(22) Filed: Jul. 28, 2003

(65) Prior Publication Data

US 2005/0024778 A1 Feb. 3, 2005

(51) Int. Cl.
*G11B 5/147* (2006.01)
(52) U.S. Cl. .................... 360/126; 360/317; 360/318
(58) Field of Classification Search ......... 360/317–318
See application file for complete search history.

(56) References Cited

U.S. PATENT DOCUMENTS

| | | | |
|---|---|---|---|
| 4,555,740 A | | 11/1985 | Jackson et al. |
| 5,208,714 A | * | 5/1993 | Denison et al. ............. 360/316 |
| 5,212,611 A | * | 5/1993 | Dee .......................... 360/316 |
| 5,285,341 A | * | 2/1994 | Suzuki et al. ............... 360/121 |
| 5,491,606 A | | 2/1996 | Hesterman et al. |
| 5,742,457 A | | 4/1998 | Simmons et al. |
| 5,768,070 A | | 6/1998 | Krounbi et al. |
| 5,805,391 A | | 9/1998 | Chang et al. |
| 5,949,624 A | | 9/1999 | Simmons et al. |
| 6,195,229 B1 | | 2/2001 | Shen et al. |
| 6,278,591 B1 | | 8/2001 | Chang et al. |
| 6,339,524 B1 | | 1/2002 | Furusawa et al. |
| 6,392,840 B1 | | 5/2002 | Chen |

OTHER PUBLICATIONS

Church, M.A., Jones Jr., R.E., and Yeh, T.H., "Thin Film Head Assembly Side-by-Side Elements," *IBM Technical Disclosure Bulletin*, vol. 24, No. 4, Sep. 1981.

Barlow, M., Church, M.A., Jones Jr., R.E., Yeh, T.H., "Thin Film Magnetic Head Assembly," *IBM Technical Disclosure Bulletin*, vol. 24, No. 4, Sep. 1981.

Jones D.M., "Parallel Servo-Track Write and Read Verification with Side-by-Side Inductive Head Elements," *IBM Technical Disclosure Bulletin*, vol. 26, No. 8, Jan. 1984.

* cited by examiner

*Primary Examiner*—A. J. Heinz
(74) *Attorney, Agent, or Firm*—Chambliss, Bahner & Stophel, P.C.; David W. Lynch

(57) ABSTRACT

The present invention is a side-by-side inductive head structure having a considerably reduced separation between the read and write elements of the head structure. The present invention also provides a thin film inductive head design to minimize rework during a fabrication process.

19 Claims, 10 Drawing Sheets

HIGH EFFICIENCY SIDE-BY-SIDE THIN FILM HEAD UTILIZING CANTED SHIELD YOKES

BACKGROUND OF THE INVENTION

1. Field of the Invention

This invention relates in general to magnetic recording systems, and more particularly to magnetic recording systems that use side-by-side thin film head designs.

2. Description of Related Art

Fixed magnetic storage systems are now commonplace as a main non-volatile storage in modern personal computers, workstations, and portable computers. Storage systems are now capable of storing gigabyte quantities of digital data, even when implemented in portable computers.

Many important advances have been made that provide higher data density and thus increased storage capacities for storage systems. These advances include faster access speeds and faster access times resulting in a greater bandwidth of data communicated to and from the storage systems. Advances have also been made by greatly reducing the size and weight of the storage systems, resulting in the availability of ultra-light portable computers having state-of-the art capabilities and performance.

A disk drive is one example of a magnetic storage system. A disk drive storage system, for example, uses a rotatable disk with concentric data tracks containing information, a head for reading and/or writing data onto the various tracks, and an actuator connected to a sensor for moving the sensor to a desired track and maintaining the sensor over the track centerline during read and write operations. The sensor is suspended in close proximity to a recording medium. For example, the sensor may be suspended over a magnetic disk having a plurality of concentric tracks. Another type of magnetic storage system includes a magnetic tape system. However, storage systems are not limited merely to the above-mentioned magnetic storage systems.

Disk drive storage systems utilize thin film head designs that are mostly variations of a merged design or a piggyback design. The merged design, as well as the piggyback design, places a write element atop a read sensor. In these dual-element designs, an inductive coil element used for writing and a magnetoresistive (MR) element used for reading are spaced apart from one another in a direction perpendicular to the trailing end of the merged head.

A problem with dual-element heads is commingling of magnetic fields. For example, the magnetic field from an inductive write element can alter the magnetization state of a nearby magnetoresistive read element because the read and write elements are closely spaced relative to one another. This may produce unwanted magnetic instability in, for example, the read head functionality. Moreover, some magnetic flux does flow though the second shield (S2) and magnetoresistive layers even with increases in shield thickness and element separation.

Another drawback of the merged and piggyback designs is that the write head is positioned far from the large thermal heat sink of a thin film head's slider. Accordingly, the placement of write coils relative to a read head causes unwanted thermal effects prolonging heat dissipation. Also, the write head protrudes towards the air-bearing surface (ABS) causing a greater read element-to-ABS distance.

Side-by-side dual-element heads have been proposed to address these problems. In a side-by-side head, the write gap and the magnetoresistive sensing film of the MR read element are located in the same plane of the slider but are spaced apart from one another in a direction parallel to the slider trailing end. In this design, the read and write elements are not simultaneously located over the same track so it is necessary for the actuator to move the slider if read and write operations are to take place sequentially on the same track.

The side-by-side design may eliminate the magnetic coupling between the read and write heads and diminish the write head's protrusion (e.g., by placing the coils much closer to the slider). However, this design results in a loss of recorded density because of a very large separation between the read and write head pole tips; as separation and isolation between the read and write head poles increases, the loss of recorded density (i.e., transducer's ability to sense and write distinguishable transitions) increases.

One reason for this loss of recorded density is that the inside and outside tracks recorded onto a recording medium, such as a disk, are controlled by the placement of the read or write head in the side-by-side dual-head configuration. Accordingly, the total number of written tracks is reduced because the actuator positions one of the read or write poles of the side-by-side head closer to the inside or outside of the disk than the other head (at the limit of rotary travel). The head closest to the center of the disk, as viewed when the actuator is at the actuator's inner and outer limits on the disk surface, limits the ability of one side-by-side read or write head to read and write to both the innermost and outermost tracks. Accordingly, a loss of recorded density results from this inability to read and write to these innermost and outermost tracks.

Another concern in side-by-side thin film head designs is the fabrication process. In any manufacturing operation, yield converts directly to profit. High yields are essential in real-time cost recovery for the billion-dollar fabrication lines of today. In the fabrication of thin film heads, there are two critical features, the width of the read sensor (MRw) and the width of the write pole tip (P2w), to determine areal density. Areal or bit density of a write head indicates the number of bits that can be written to a square inch of magnetic media, such as a magnetic tape or magnetic disk.

In the fabrication of a prior art thin-film inductive head, a first pole piece layer (P1) is deposited on a substrate. A write gap layer is deposited over the P1 layer, wherein the write gap layer greatly affects the linear resolution of a recording head. A coil layer is then formed over the write gap layer and a second pole layer (P2) is formed over the coil layer.

The second pole piece layer is the most demanding structure in the whole fabrication process. The second pole piece layer is the most demanding structure because the width of the second pole piece layer (P2w) is critical to determining the width of a written track. Accordingly, if the P2 layer is fabricated poorly, reworking of the head becomes extremely difficult and the head may have to be discarded. Discarding the heads results in a process yield loss, which directly relates to a loss in profit.

It can be seen that there is a need for a method and apparatus for a side-by-side thin film head with minimal separation between the read and write structures.

It also can be seen that there is a need for a method and apparatus for fabricating thin film inductive heads that can be reworked with a minimum yield loss.

SUMMARY OF THE INVENTION

To overcome the limitations in the prior art described above, and to overcome other limitations that will become apparent upon reading and understanding the present specification, the present invention discloses a method and apparatus for magnetic recording systems using side-by-side read/write head.

The present invention solves the above-described problems by providing a side-by-side head structure having a considerably reduced separation between the read and write elements of a head structure.

A method forming a side-by-side read/write head includes forming a write head and a read head side-by-side, wherein the write head includes a first layer having a first pole tip that defines a width of a written track and the read head includes a magnetic sensor element and shields, yokes for the shields being canted to allow the read head to be positioned closer to the write head.

In another embodiment a side-by-side read/write head is provided. The side-by-side read/write head includes a write head and a read head formed side-by-side, wherein the write head includes a first layer having a first pole tip that defines a width of a written track and the read head includes a magnetic sensor element and shields, yokes for the shields being canted to allow the read head to be positioned closer to the write head.

In another embodiment a magnetic storage system is provided. The magnetic storage system includes a moveable magnetic storage medium, an actuator and a side-by-side read/write head coupled to the actuator, wherein the write head includes a first layer having a first pole tip that defines a width of a written track and the read head includes a magnetic sensor element and shields, yokes for the shields being canted to allow the read head to be positioned closer to the write head.

In another embodiment another side-by-side read/write head is provided. This side-by-side read/write head includes write means and read means formed side-by-side, wherein the write means includes a first means having a first pole means for defining a width of a written track and the read means includes sensor means and shield means for shielding the sensor means, wherein the shield means further includes yoke means for concentrating magnetic flux therebetween, the yoke means being canted to allow the read means to be positioned closer to the write means.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings, which form a part hereof, and in which is shown by way of illustration the specific embodiment in which the invention may be practiced. It is to be understood that other embodiments may be utilized as structural changes may be made without departing from the scope of the present invention.

The present invention is a side-by-side head structure having a considerably reduced separation between the read and write elements of a head structure.

The present invention thus provides a reduction in the distance between tracks on a disk's surface. The side-by-side head is able to read and write to more of a recording medium's surface and thus increases the recording density of the system. The present invention also provides a thin film head design, wherein the write pole that determines a width of a written track for the write head is formed first to minimize rework during the fabrication process.

Figure 1:
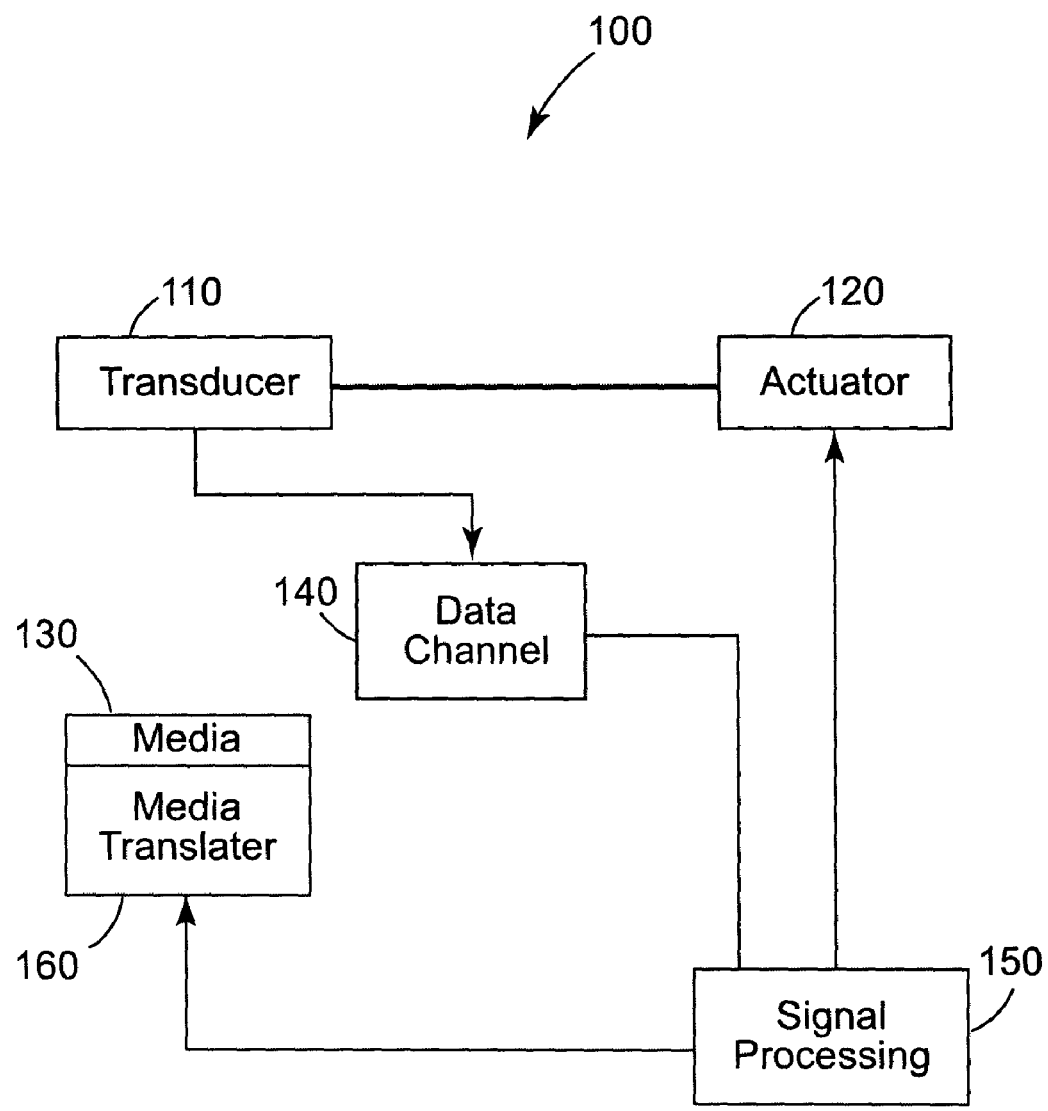
FIG. 1 illustrates a storage system.

FIG. 1 illustrates a storage system 100. In FIG. 1, a transducer 110 is under control of an actuator 120. The actuator 120 controls the position of the transducer 110. The transducer 110 writes and reads data on magnetic media 130. The read/write signals are passed to a data channel 140. A signal processor 150 controls the actuator 120 and processes the signals of the data channel 140. In addition, a media translator 160 is controlled by the signal processor 150 to cause the magnetic media 130 to move relative to the transducer 110. The present invention is not meant to be limited to a particular type of storage system 100 or to the type of media 130 used in the storage system 100.

Figure 2:
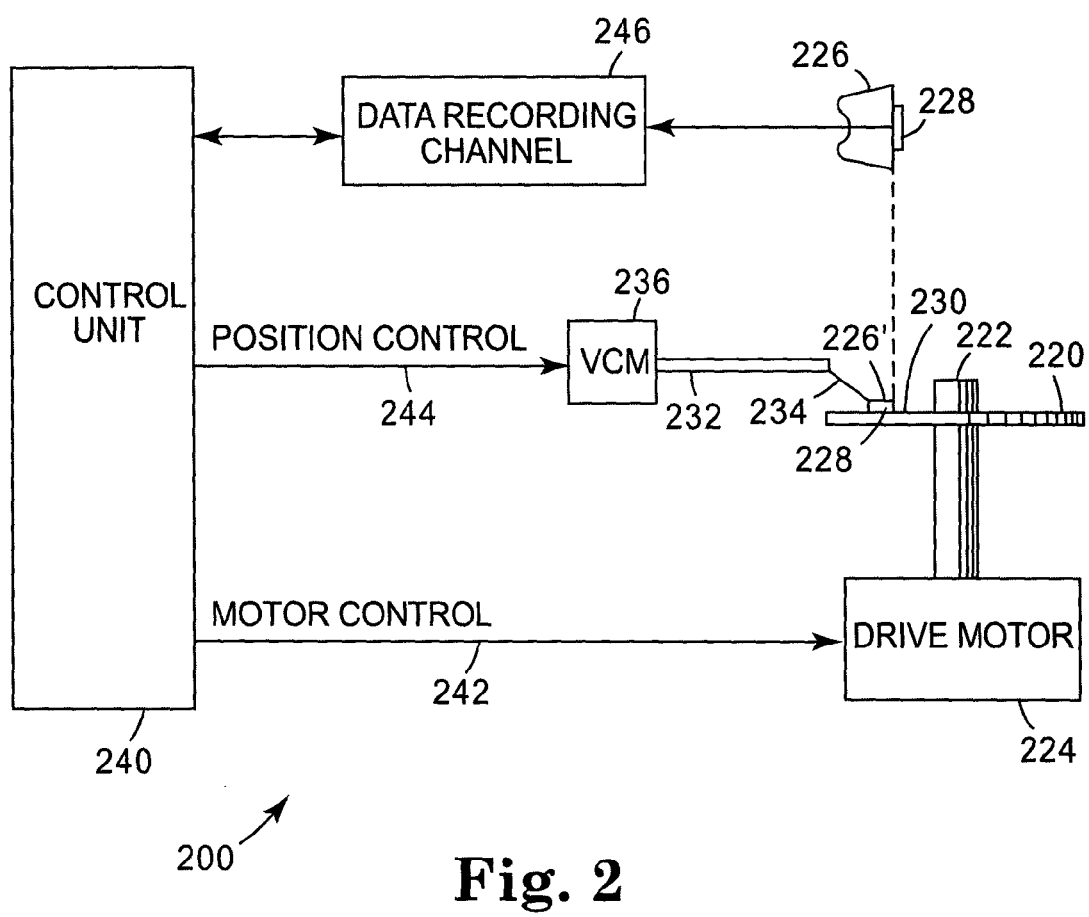
FIG. 2 is an illustration of one example of a magnetic disk drive storage system.

FIG. 2 is an illustration of one example of a magnetic disk drive storage system 200. As shown in FIG. 2, at least one rotatable magnetic disk 220 is supported on a spindle 222 and rotated by a disk drive motor 224. The magnetic recording media on each disk 220 is in the form of an annular pattern of concentric data tracks (not shown).

At least one slider 226 is positioned on the disk 220, each slider 226 supporting one or more magnetic read/write heads 228, wherein the heads 228 incorporate a side-by-side sensor of the present invention. As the disk(s) 220 rotate, slider 226 is moved radially in and out over disk surface 230 so that the heads 228 may access different portions of the disk 220 wherein desired data may be recorded or written. Each slider 226 is attached to an actuator arm 232 by means of a suspension 234. The suspension 234 provides a slight spring force, which biases the slider 226 against the disk surface 230. Each actuator arm 232 is attached to an actuator 236. The actuator 236 may, for example, be a voice coil motor (VCM). The direction and speed of the actuator is controlled by position signals 244 supplied by a control unit 240.

During operation of the disk drive 200, the rotation of the disk 220 generates an air bearing between the slider 226 and the disk surface 230, which exerts an upward force or lift on the slider 226. The surface of the slider 226, which includes the heads 228 and faces the surface of disk 220 is referred to as an air-bearing surface (ABS). The air bearing thus counter-balances the slight spring force of suspension 234 and, during normal operation, supports the slider 226 off of, and slightly above, the disk surface 230 at a small, substantially constant spacing.

The various components of the disk drive 200 are controlled in operation by control signals generated by a control unit 240, such as access control signals and internal clock signals. Typically, control unit 240 has logic control circuits, storage apparatus, and a microprocessor. The control unit 240 generates control signals to control various system operations such as position control signals 242 and motor control signals 244. The motor control signals 244 provide the desired profiles to optimally move and position the slider 226 to the desired data track on the disk 220. Read and write signals are communicated to and from the read/write heads 228 through a recording channel 246.

The above description of a typical magnetic disk drive storage system 200 is for representation purposes only. It should be apparent that disk storage systems may contain a large number of disks and actuators, and that each actuator may support a number of sliders. Many other variations of the basic typical magnetic storage system 200 may be used in conjunction with the present invention while keeping within the scope and intention of the invention. However, those skilled in the art will recognized that the present invention is not meant to be limited to magnetic storage systems as illustrated in FIG. 2.

Figure 3:
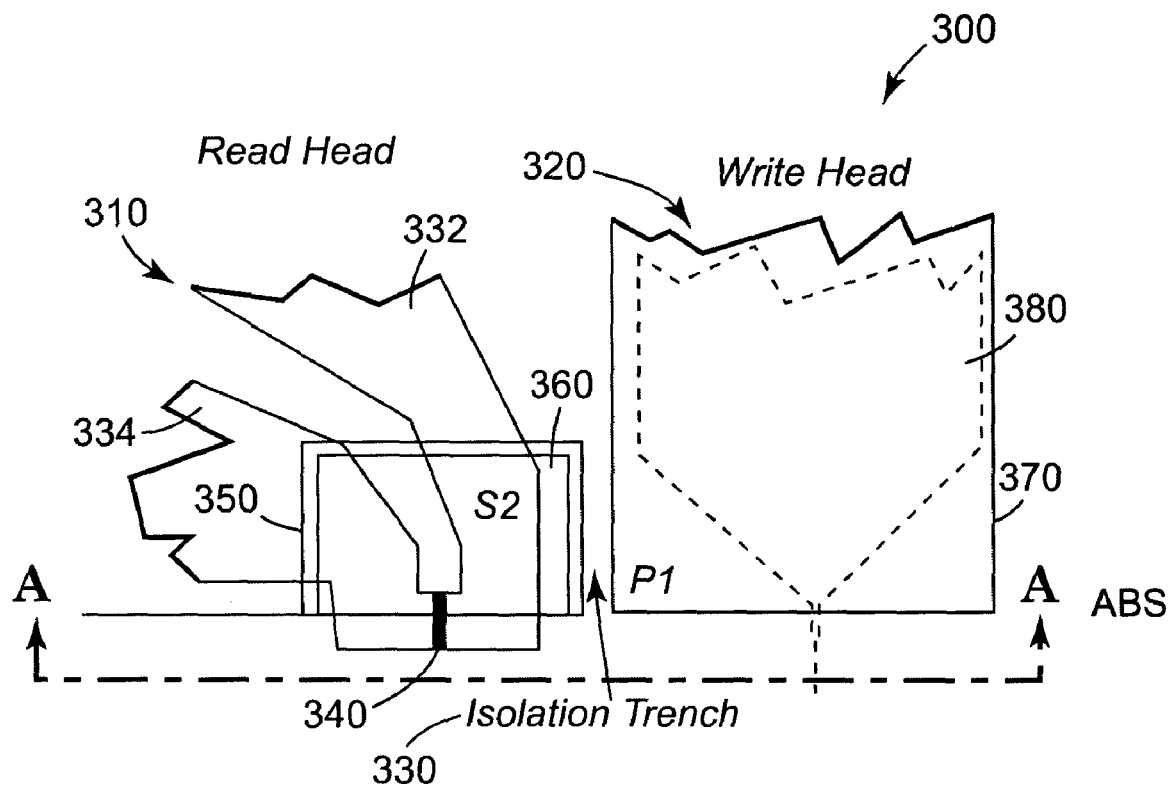
FIG. 3 illustrates a separation between a read and write structure of a magnetic head according to the present invention.
Figure 4:
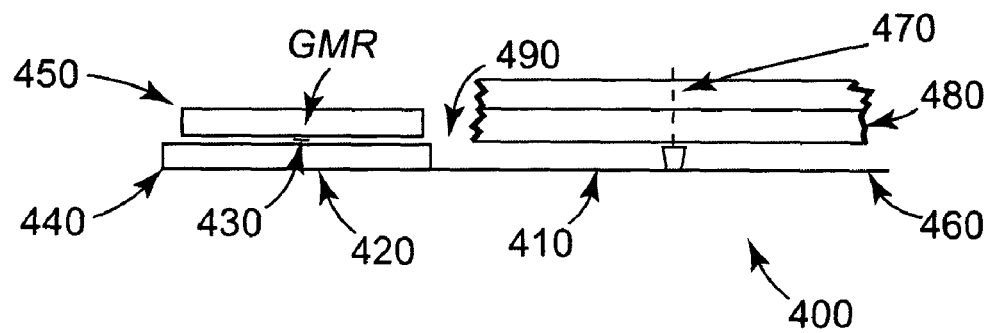
FIG. 4 is an air bearing surface (ABS) view of the side-by-side magnetic head illustrated in FIG. 3 according to the present invention.

FIGS. 3–4 illustrate a side-by-side read/write head. However, FIGS. 3–4 do not show the write coil, and therefore the separation between the read element and the write tip is not shown to scale.

FIG. 3 illustrates a separation between a read and write structure of a magnetic head 300 according to the present invention. Separate read 310 and write 320 structures are mounted on slider (FIG. 2, 226) and are spaced apart by an isolation trench 330. A read head sensor 340 is sandwiched between a ferromagnetic first shield layer 350 and a second shield layer 360. The write head structure 320 includes a first pole piece layer 370 formed over a second pole piece layer 380 that is separated by a write gap layer (not shown) at an ABS. Leads 332, 334 are coupled to sensor 340.

FIG. 4 is an air bearing surface (ABS) view 400 of the side-by-side magnetic head illustrated in FIG. 3 according to the present invention. The ABS view includes a write head portion 410 and a read head portion 420 separated by an isolation trench 490. The read head portion 420 has a sensor 430. In FIG. 4, the sensor 430 is sandwiched between at least a first shield layer (S1) 440 and a second shield layer (S2) 450. In response to external magnetic fields, a resistance of the sensor 430 changes. A sense current $I_s$ (not shown) conducted through the sensor 430 changes in response to the changes in the magnetic field detected from the storage media. These potential changes are then processed as read-back signals by the processing circuitry shown in FIGS. 1 and 2.

The write head portion 410 of the side-by-side magnetic head illustrated in FIG. 3 includes a first pole piece layer (P1) 470 formed over a second pole piece layer (P2) 460. The first and second pole piece layers 470, 460 are magnetically coupled and are separated by a write gap layer 480, such as an alumina spacer, at the ABS. The first and second pole piece layers 470, 460, along with the write gap layer 480, form a transducing element wherein magnetic flux crosses the write gap layer 480 and creates magnetic transitions on a magnetic recording medium.

Two types of magnetic recording that may be used in accordance with the present invention are longitudinal recording, in which the medium magnetization is parallel to the recording medium (e.g., parallel to the plane of a disk), and perpendicular recording, in which the medium magnetization is normal to the plane of the medium (e.g., normal to a plane of a disk). However, the present invention is not limited to a specific one of these two types of magnetic recording.

Figure 5:
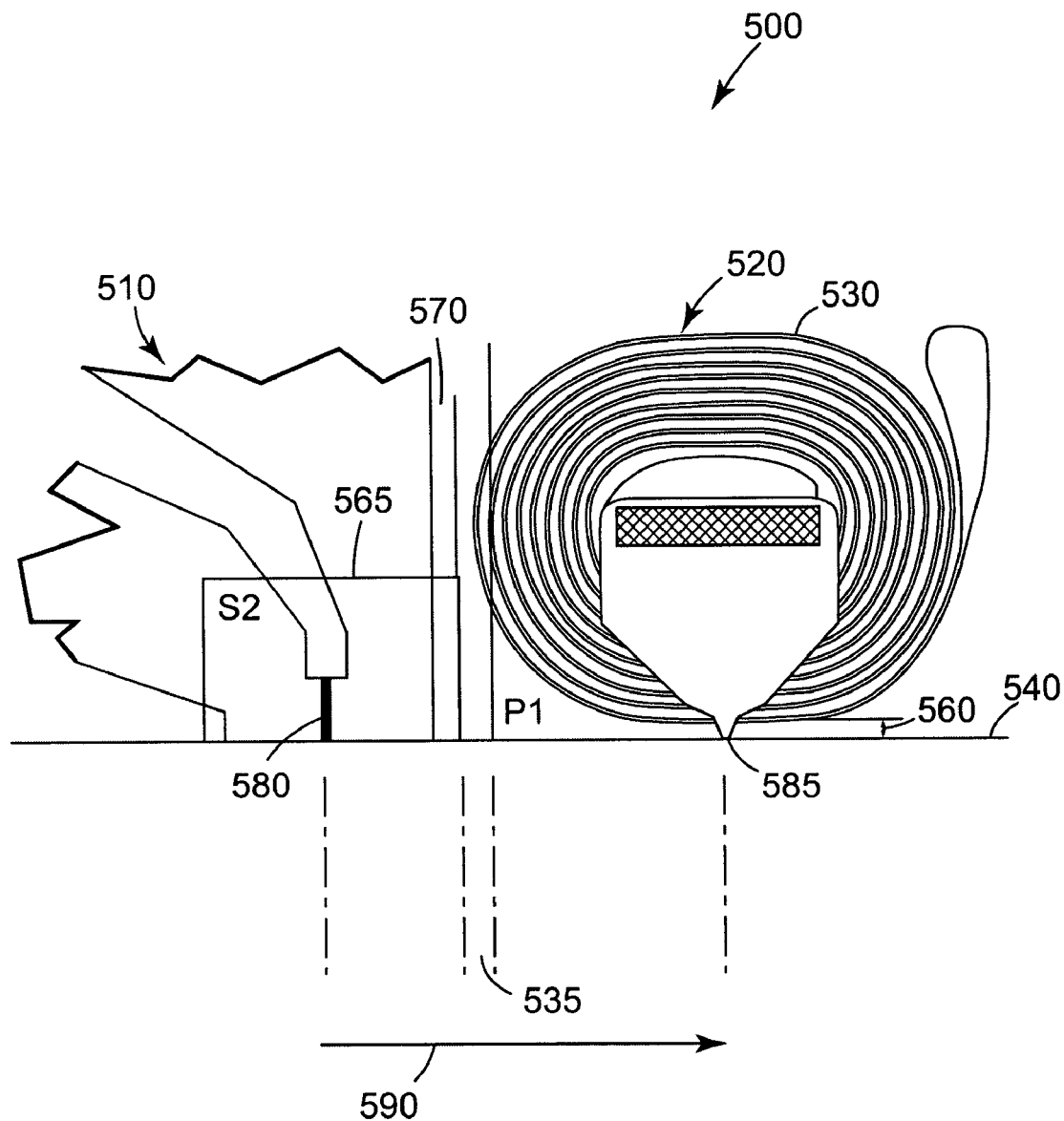
FIG. 5 is one embodiment illustrating magnetic instability between read and write elements of a side-by-side magnetic head.

FIG. 5 is a side-by-side thin film head 500 according to an embodiment of the present invention. In the fabrication of read/write heads it is very difficult to achieve full isolation 535 between the read and write head and also minimize the distance 590 between a read sensor 580 and a write pole 585. Hence, a commingling of magnetic functions (e.g., magnetic cross-talk) between the structures 510, 520 produces unwanted magnetic instability in, for example, read head functions.

In FIG. 5, the write head 520 includes a coil 530 embedded in an insulation stack, the insulation stack being sandwiched between first and second pole piece layers described in FIG. 4. Current conducted through the coil 530 induces a magnetic field into the pole pieces (FIG. 4, 460, 470) that fringes across the gap (FIG. 4, 480) between the pole pieces (FIG. 4, 460, 470) at the ABS 540 and through the disk (FIG. 2, 220). The fringe field writes information in tracks on moving media, such as in circular tracks on a rotating disk (FIG. 2, 220).

As illustrated in FIG. 5, a coil 530 may be placed very close to the ABS 540 to form a separation 560. The position of the coil 530 of the write head 520 allows the coil 530 to extend sideways closer to the shields 565, 570 of the read head 510. The write head 520 and the read head have a separation 535 therebetween. In FIG. 5, the magnitude of the separation 535 between the coil 530 and the shields 565, 570 is limited by the coil 530, the shape of the write poles (P1 shown in FIG. 5) and the shape of the shields 565, 570. However, the yoke of the shields 565, 570 is canted to allow the write pole tip to be much closer to the read sensor 580. Nevertheless, the separation between the read sensor 580 and the write pole 585 of this side-by-side head design creates a distance 590 that is not minimized to produce closer track alignment between the read and write heads 510, 520.

Figure 6:
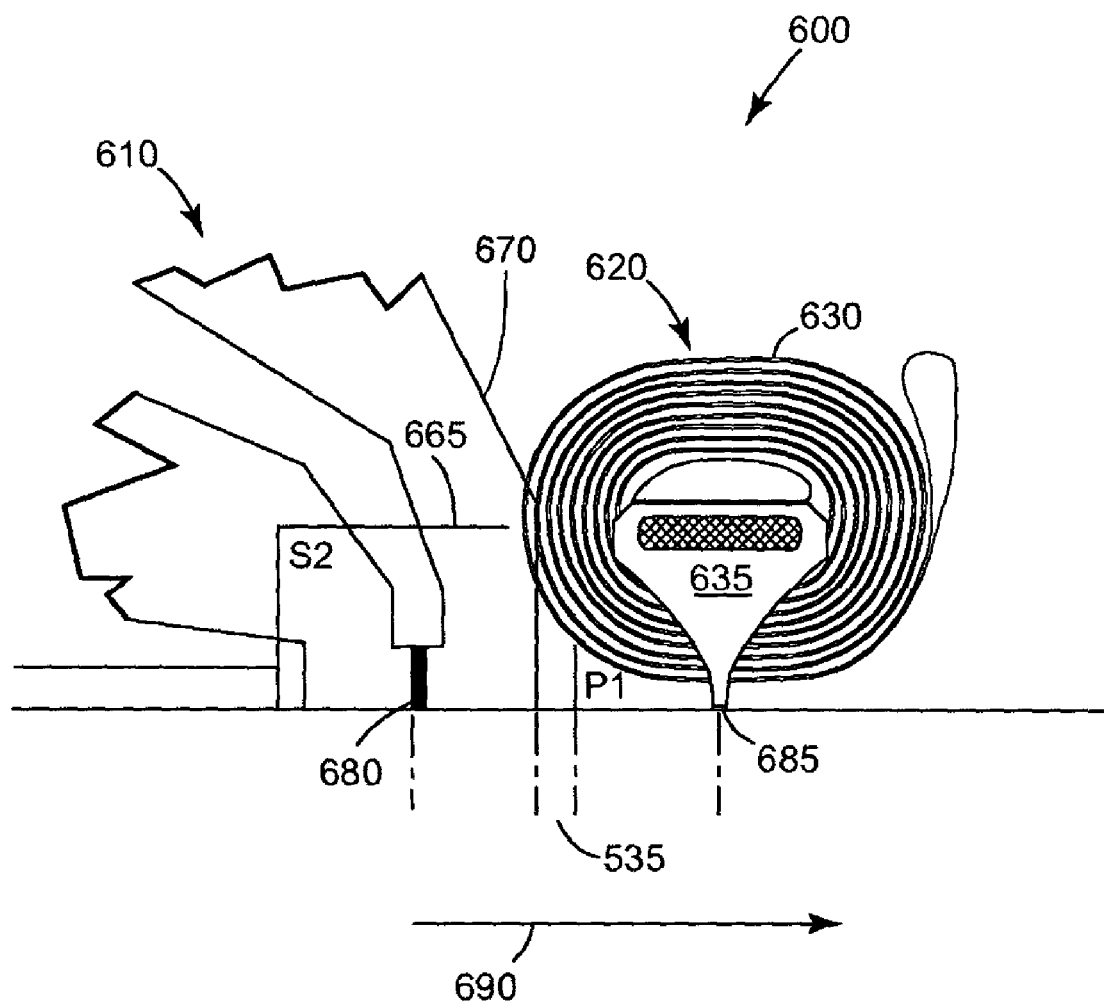
FIG. 6 is another embodiment illustrating magnetic instability between read and write elements of a side-by-side magnetic head.

FIG. 6 is another side-by-side thin film head 600 according to an embodiment of the present invention. In FIG. 6, the coil 630 partly overlaps the second shield (S2) 665 of the read head 610 resulting in minimal, if any, isolation 635 between the read head 610 and the write head 620. The overlap of the coil 630 and the second shield 665 increases, for example, magnetic cross-talk between the read head 610 and the write head 620. Again, however, the yoke of the shields 665, 670 is canted to allow the write pole tip 685 to be much closer to the read sensor 680. Still, the separation between the read sensor 680 and the write pole tip 685 of this side-by-side head design creates a distance 690 that is not minimized.

Figure 7:
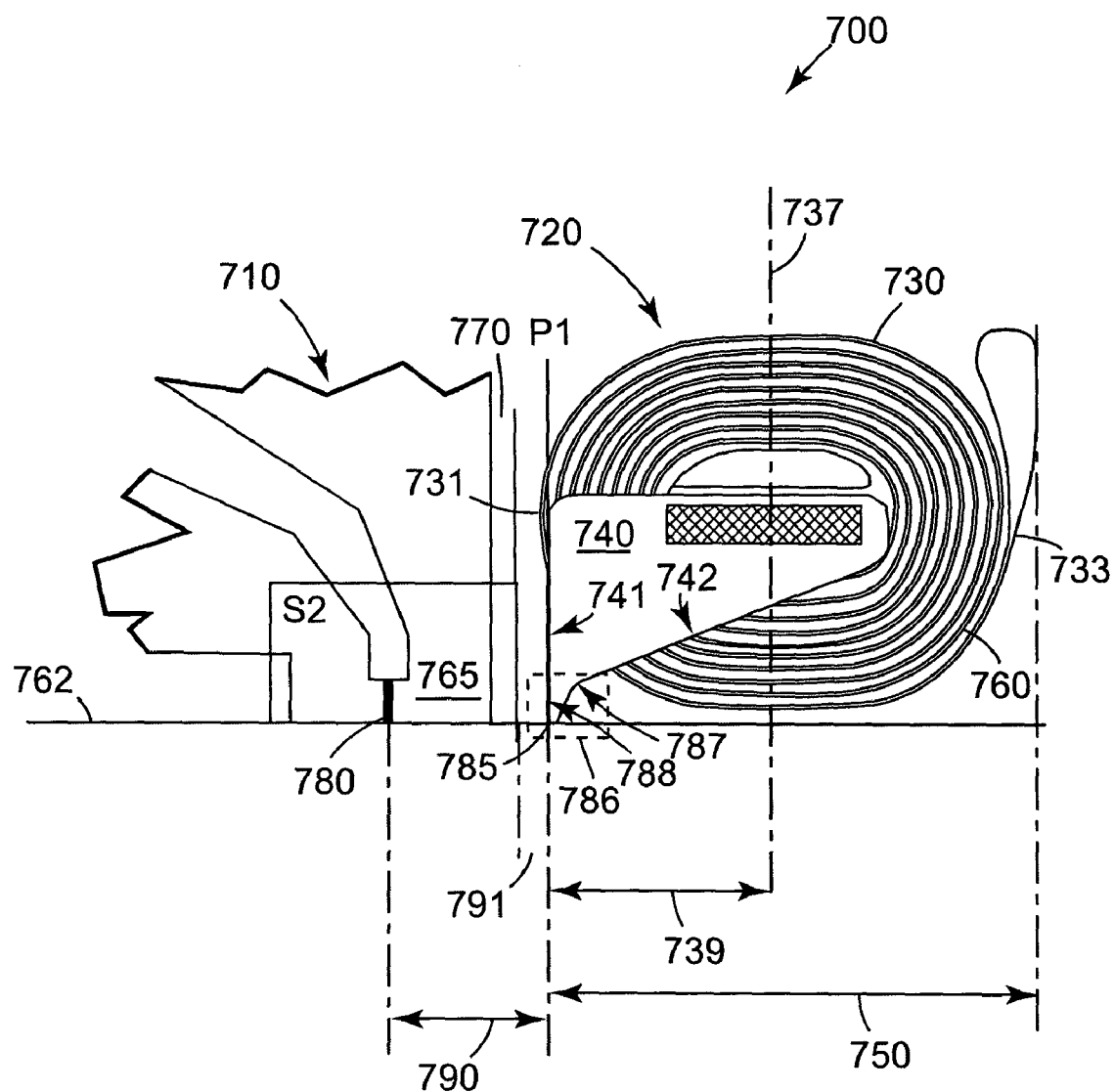
FIG. 7 illustrates a side-by-side head with a reduced separation between the read and write head structures to provide increased recording density according to the present invention.

FIG. 7 illustrates a side-by-side head 700 according to an embodiment of the present invention, wherein the separation between the read and write head structures is minimized to provide increased recording density. The present invention is a side-by-side magnetic head having a high resolution, high data rate head design with a very small footprint. The present invention includes a compact and high-density coil pitch (e.g., 1 µm or less) 760, which contributes to the high resolution.

The present invention also provides a thin film head design that minimizes rework during a fabrication process. A first formed shield layer of a read head is juxtaposed to a first formed pole layer of a write head, wherein the first pole layer has a first pole tip for defining a width of a written track. A first and a second insulation layer are then formed over the first shield layer and first pole layer, respectively. Then, a second shield layer is formed over the first insulating layer and a pedestal layer is formed over the second insulation layer for forming a read and a write head structure 710, 720 respectively.

The side-by-side head 700 according to the present invention provides a read head 710 and a write head 720. The read head 710 includes a read element 780. The write head 720 includes a coil 730 and a pole tip 785. The coil 730 has a first side 731, a second side 733 and a central axis 737, wherein the coil's first side 731 is proximate to the read head 710. The central axis 737 is perpendicular to an air-bearing surface 762. The present invention also positions the pole tip 785 offset 739 from the central axis 737 towards the read element 780 to provide substantially closer track alignment between the read and write heads 710, 720. It is to be understood that closer track alignment refers to the offsetting of the write pole tip 785 from the central axis 737 to reduce the distance 790 between the read element 780 and the write pole tip 785.

Accordingly, modifications may be made to the shape of the conventional yoke 635 illustrated in FIG. 6 to provide for a substantially closer track alignment between read and write heads. In FIG. 7, these modifications are made to the shape of the yoke 740 of the write head 720 because the size of the coil's footprint 750 can not be altered, i.e., the footprint 750 is fixed by the size of a magnetic back gap (i.e., opposite the end of the write gap where the pole pieces P1 and P2 join, not shown in the instant diagram) as well as the pitch of the coils 760.

Also, the modifications are made to the shape of the yoke 740 because the size of the coil 730 and the coil's necessary separation 791 from the shields 765, 770 of the read head 710 fix a distance 790 between the read head 710 and the write head 720. Thus, the coil 730, and the pole tip of a conventional yoke design (FIG. 6, 685) is prevented from being moved closer to the read head 710.

In one embodiment of the present invention, a yoke design 740 having a front flare 786 is utilized to position the pole tip 785 offset 739 from the central axis 737 towards the read element 780. However, the present invention is not limited to this design. This design may also utilize, but is not limited to, flared sides, wherein side 787 and side 788 are both flared (the instant diagram only showing one side 787 flared); both sides 787, 788 being close to the ABS 762. In this flared side design, both sides 787, 788 of the flare 786 are slanting at the same angle to the central pole 785.

In FIG. 7, the yoke design 740 of the write head 720 shows that side 741 is perpendicular to the ABS 762 and side 742 is angled to position the pole 785 of the write head 720 offset 739 from a central axis 737 in a direction towards the sensor 780 of the read head 710. This design produces a considerable reduction in the distance 790 between the read sensor 780 and the write pole 785. However, the present invention is not limited to this design and side 741 may also be at an angle to assist in positioning the pole 785 of the write head 720 offset 739 from a central axis 737 in a direction towards the sensor 780 of the read head 710.

According to the present invention, even when the same coil footprint 750 and pitch 760 of a conventional shaped coil (with a separation 791 between a write head coil 730 and a read head shield 765, 770) is maintained, the distance 790 between the read sensor 780 and the write pole 785 is reduced.

Furthermore, according to the present invention, this design of the side-by-side head structure of FIG. 7 maintains full thermal benefits of improved heat dissipation produced by the coil 730. The improved thermal benefits occur because both the coil 730 of the write head 720 and the read head 710 can be placed very close to the slider body (FIG. 2, 226) as opposed to a merged or piggy back design where the position of the write heads are far from the large thermal heat sink of a slider body.

FIGS. 8–12 illustrate the fabrication of a side-by-side read/write head of the present invention. The write pole that determines a width of a written track for the write head is formed first. The write pole in the present invention is formed first because the fabrication of the write pole of the write head structure is the most demanding structure of the side-by-side read/write head to fabricate and thus most likely to require reworking. The fabrication of the write pole is demanding because the width of the write pole piece is critical in determining the width of a written track. Hence, in the present invention, even in the event of a poorly fabricated write pole, a wafer can be reworked with minimal loss of materials, labor and cost.

Figure 8A:
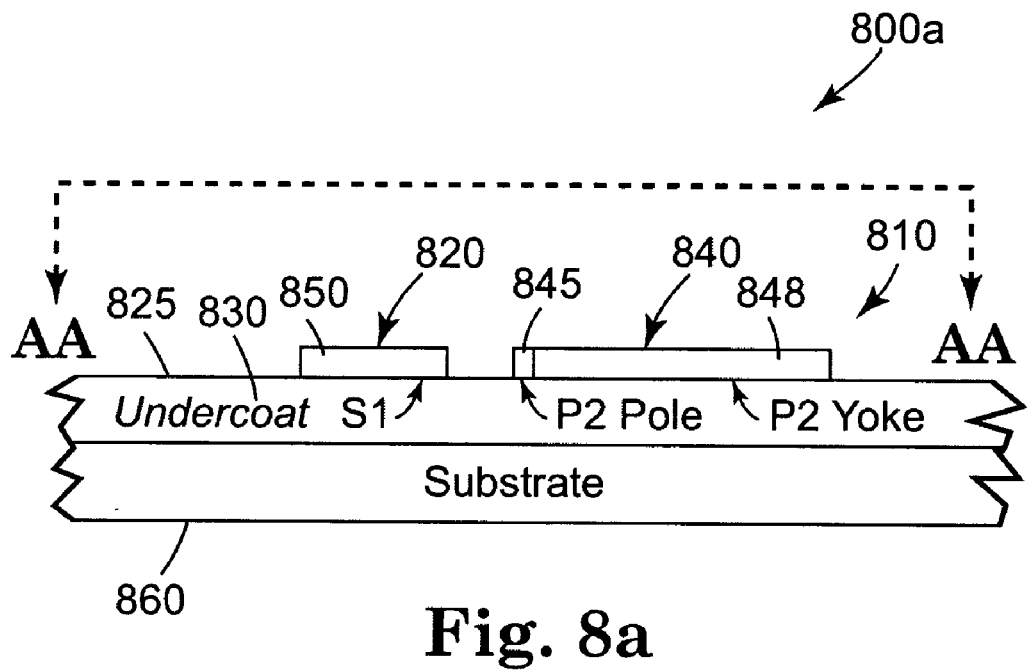
FIGS. 8a and 8b illustrate a side-by-side read/write head according to the present invention.
Figure 8B:
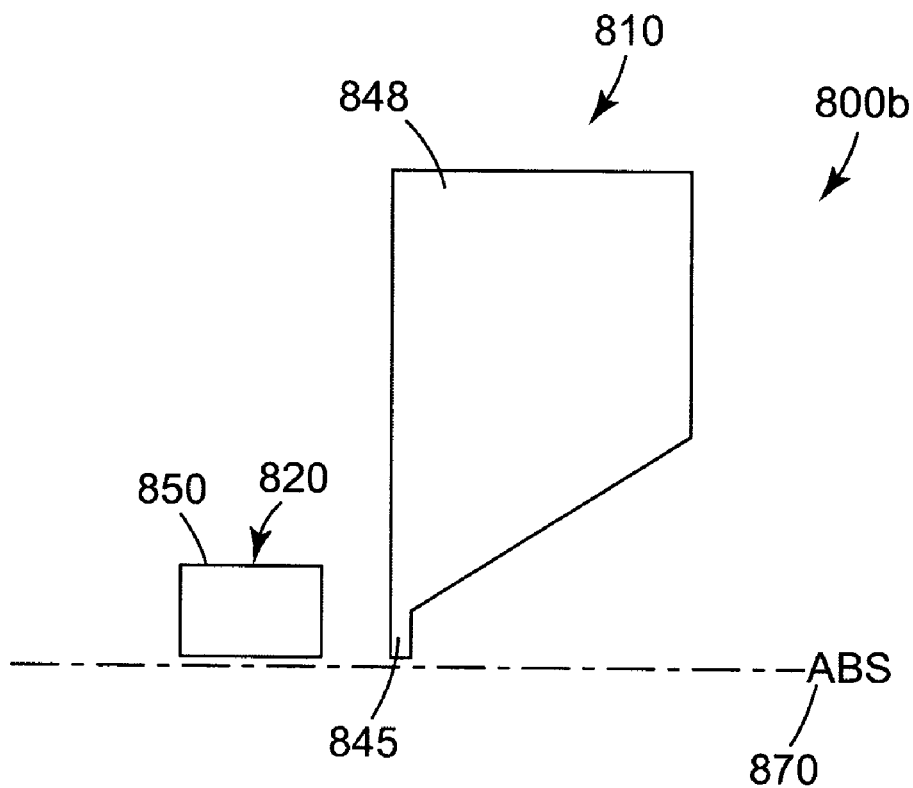

FIGS. 8a and 8b illustrate a side-by-side read/write head 800a, 800b according to the present invention. In the side-by-side design 800a, 800b of the present invention, it is important to note that care is taken to protect one head during the fabrication of the other head. According to the present invention, forming both read and write head structures at the same time can accelerate the fabrication of a side-by-side read/write head.

For example, if the material and thickness of the write layer (P2) 840 of a write head 810 and a first shield layer (S1) 850 of a read head 820 are the same, both the write layer (P2) 840 and a first shield layer (S1) 850 can be fabricated in one step. Also, coils and leads can be fabricated in one step, an a second shield layer (S2) for the read head 820 and a pedestal for the write head 810 can be fabricated simultaneously in one step according to the present invention. However, the present invention is not limited to fabricating the above structures in the same step.

FIG. 8a illustrates a profile view of a first step in the fabrication of a side-by-side longitudinal read/write head 800a according to the present invention. However, the present invention is not limited to longitudinal recording. In FIG. 8a, an insulating undercoat 830, such as an alumina undercoat, is deposited over a substrate 860. A seed layer 825 is then deposited over the undercoat 830. A write layer (P2) 840 including a write pole (P2 pole) 845 and a write yoke (P2 yoke) 848 is deposited over the seed layer 835. In addition, a first shield (S1) layer 850 for the read head 820 is formed over the insulating seed layer 835. However, according to the present invention, the write layer (P2) 840 and the first shield layer (S1) 820 may be formed simultaneously in a same fabrication step.

FIG. 8b illustrates a top view AA of the side-by-side read/write head 800b using the design of FIG. 8a according to the present invention. In FIG. 8b, the first shield layer (S1) 850 for a read head 820 and a write layer (P2) 840 of the write head 810 are formed. The write layer (P2) 840 includes the write yoke (P2 yoke) 848 and the write pole (P2 pole) 845. However, the present invention is not limited to forming the first shield layer (S1) 850 for the read head 820 and the write layer (P2) 840 simultaneously. The first shield layer 850 and the write pole 845 are positioned close to an air-bearing surface (ABS) 870.

The write layer (P2) 840, including the write pole 845 and the write yoke 848, is formed first because, as described above, the fabrication of the write layer 840 of the write head 810 is the most demanding structure to fabricate. The structure is demanding to fabricate because the width of the write pole piece is critical in determining the width of a written track.

Figure 9A:
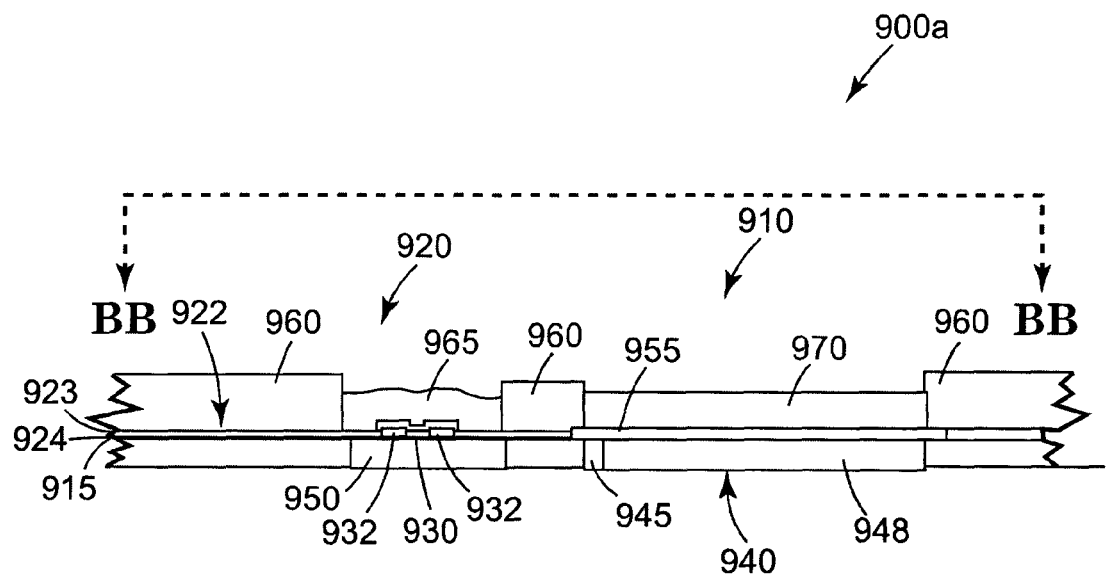
FIGS. 9a and 9b illustrate the formation of a second shield layer and a write pedestal in the fabrication of a side-by-side read/write head according to the present invention.
Figure 9B:
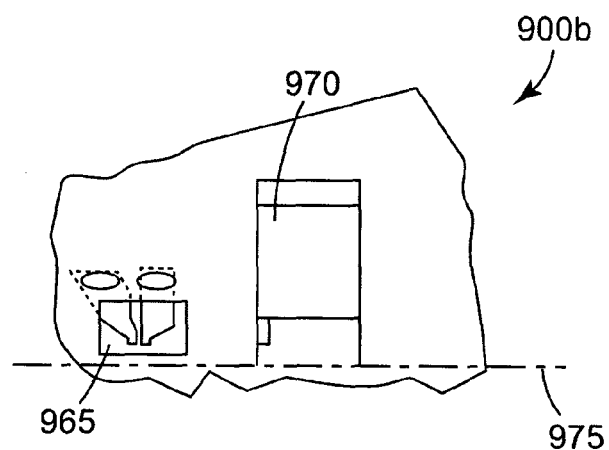

FIGS. 9a and 9b illustrate the formation of a second shield layer and a write pedestal in the fabrication of a side-by-side read/write head 900a, 900b according to the present invention. After the deposition of the write layer (P2) 940 and the first shield (S1) 950, a seed layer (not shown) is removed and a first insulating layer 915, such as alumina, is deposited over the layers 940, 950 to fill the isolation trench. The insulating layer 915 is polished to provide a planarized surface 922. The polishing may be accomplished by, but not limited to, chemical mechanical polishing (CMP). After polishing the insulating layer 915, a first read gap (G1) 924 is deposited.

A magneto-resistive (MR) element 930, preferably comprising a soft bias material, is formed, along with a hard bias layer 932, over a portion of the first read gap layer 924. The MR element can, for example, be a giant magneto-resistive (GMR) element. The MR element 930 typically includes a permalloy layer, an insulating layer, and a soft bias layer, with the magnetic layers adjusted in composition to provide a near-zero magnetostriction. A first mask (not shown) is deposited to protect an area encompassing the write head 940. Then, a second read gap layer (G2) 923 is deposited over the MR element 930. The first mask (not shown) is removed and a second mask (not shown) is deposited over an area encompassing the read head 920. The insulating first and second read gap layers 924, 923 are etched from the write layer (P2) 940, including the write pole (P2 pole) 945 and a write yoke (P2 yoke) 948, and a material 955 is deposited to form a write gap 955.

The second mask (not shown) is removed from the read head 920 and third mask 960 is deposited over the entire read/write structure 910, 920. A second shield layer (S2) 965 of a read head and a pedestal 970 for a write head are formed simultaneously. However, the present invention is not limited to forming the second shield layer (S2) 965 and the pedestal 970 simultaneously.

FIG. 9b illustrates a top view BB of the side-by-side read/write head 900b using the head design of FIG. 9a according to the present invention. In FIG. 9b, a second shield (S2) 965 for a read head 920 and the pedestal 970 for the write head 910 are formed. The first shield 965 and the pedestal 970 are positioned at an air-bearing surface (ABS) 975.

Figure 10A:
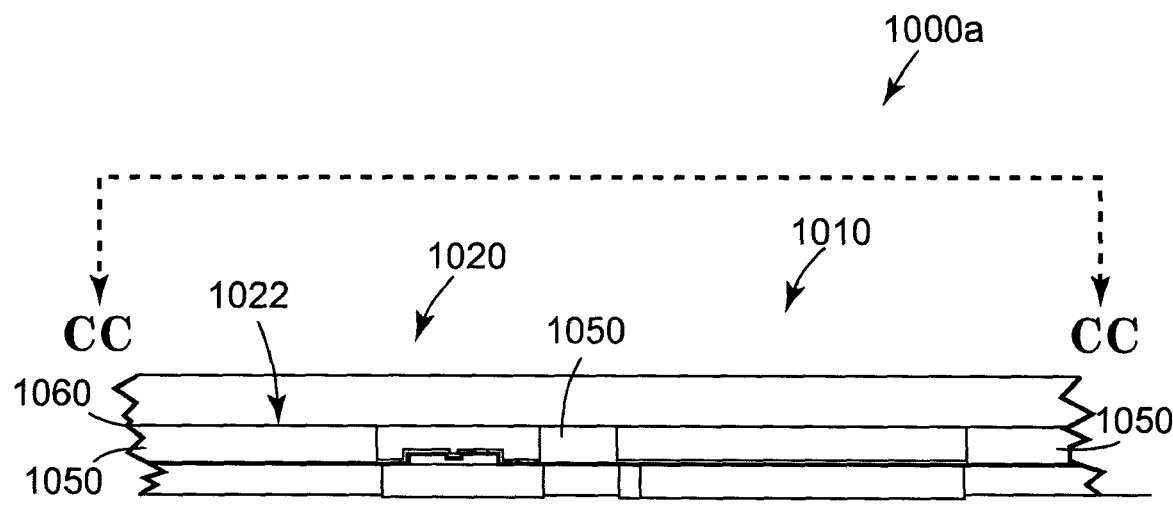
FIGS. 10a and 10b illustrate the formation of a coil and leads in the fabrication of a side-by-side read/write head according to the present invention.
Figure 10B:
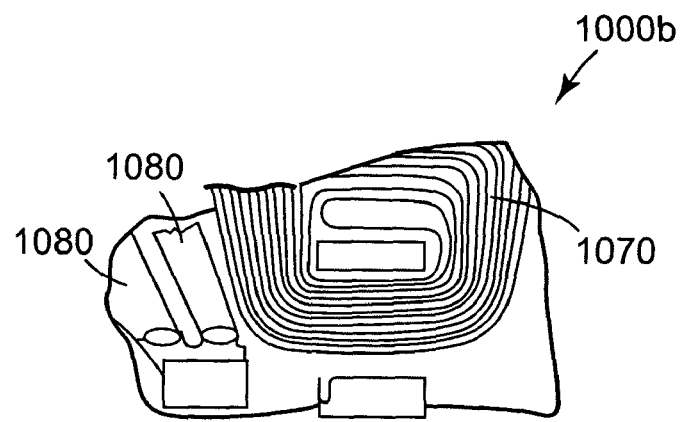

FIGS. 10a and 10b illustrate the formation of a coil and leads in the fabrication of a side-by-side read/write head 1000a, 1000b according to the present invention. The resist (FIG. 9, 960) is removed and an insulating layer 1050, such as alumina, is deposited over the read 1020 and write 1010 structures. The insulating layer 1050 is polished to provide a planarized surface 1022. The polishing may be accomplished by, but not limited to, chemical mechanical polishing (CMP). A seed layer 1060 is deposited over the insulation layer 1050. The write coil 1070 and leads 1080 for the read head are fabricated over the seed layer 1060. However, the present invention is not limited to forming the write coil 1070 and leads 1080 simultaneously.

FIG. 10b is illustrates a top view CC of the side-by-side read/write head using the head design of FIG. 10a according to the present invention. In FIG. 10b, the leads 1080 for a read head 1020 and the write coil 1070 for the write head 1010 are formed.

Figure 11A:
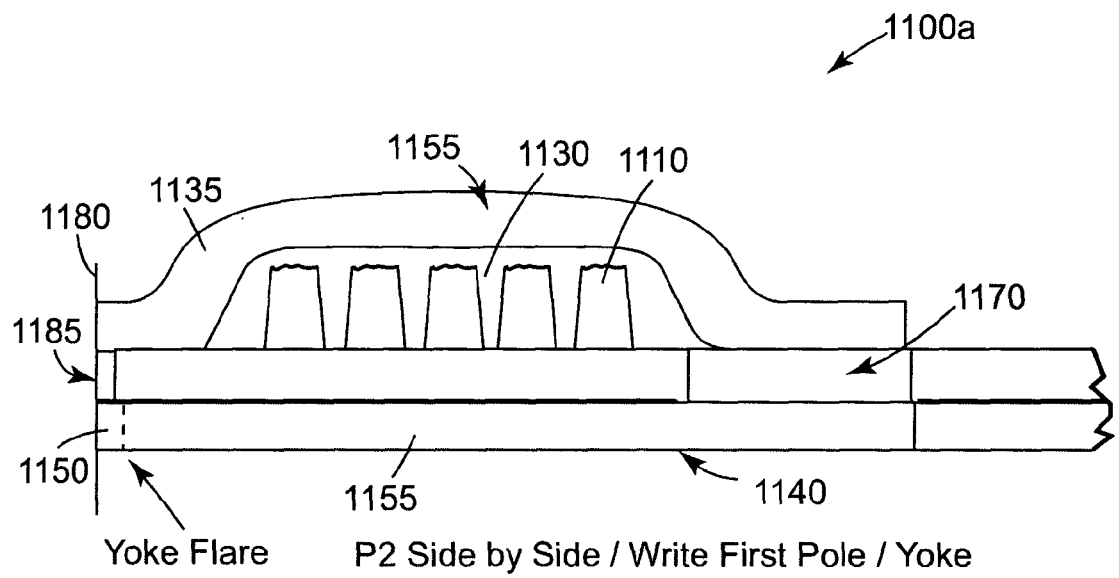
FIGS. 11a and 11b illustrate a profile of a side-by-side read/write head according to the present invention.
Figure 11B:
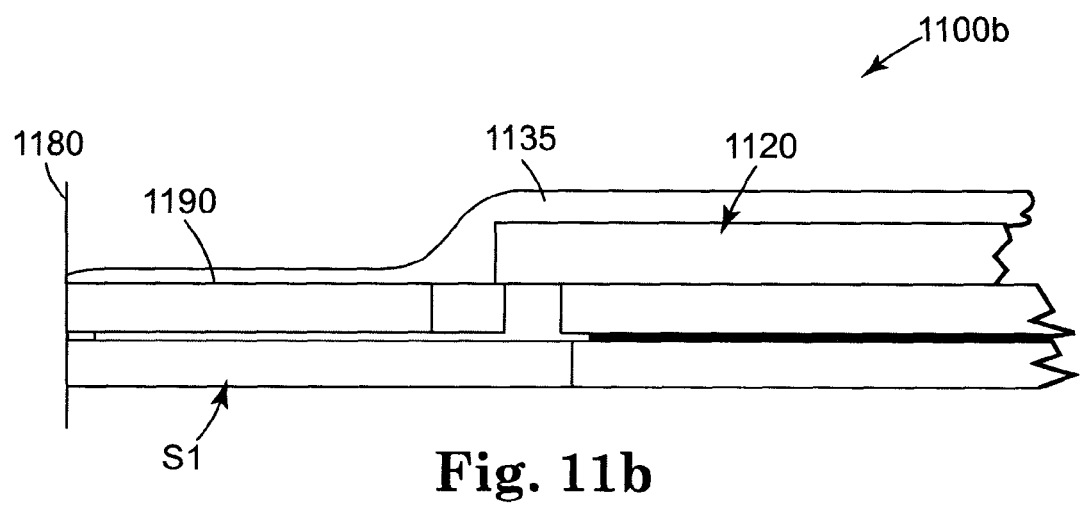

FIGS. 11a and 11b illustrates a profile of a side-by-side read/write head having a write structure 1100a and read structure 1100b according to the present invention. In FIGS. 11a and 11b, the write coil 1110 and read leads 1120 are insulated with a hard baked resist 1130. The return layer (P1 layer) 1135 is formed over the hard baked resist 1130. It can be seen the write layer (P2) 1140, including the write pole 1150 and write yoke 1155, is the lowest layer (first fabricated) in the write head 1100a. A back gap 1170 is formed at a distance aft of an air-bearing surface 1180 and couples the P1 layer 1135 and the write layer (P2) 1140.

The read head 1110b has no foreign structures deposited over top of the second shield layer or hard baked resist 1130. Accordingly, the read head structure 1100b avoids unwanted magnetic interactions and also is not stress induced by thermal conditions produced by the expansion and contraction of different materials of the foreign structures.

It is understood that other designs could have been used to fabricate the read/write structures of the present invention. For example, the coils 1130 may be formed behind the pedestal 1185 of the write head 1100a. This design would allow multiple coil layers to be formed over top of the first coil layer 1110. Also, the P1 yoke 1135 can be planarized (flat) and laminated by, for example, a vacuum deposition process. In this last case, the coils 1110 (or multiple coil layer) would have to be planarized and the back gap 1170 and stitch region plated up as magnetic vias to form a flat surface. Also, by suppressing the pedestal 1185 and providing the proper shape and thickness to the pole tip 1150, the write head 1100a can now be changed from longitudinal recording to perpendicular recording.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A side-by-side read/write head, comprising:
   a write head and a read head formed side-by-side, wherein the write head includes a first layer having a first pole tip that defines a width of a written track and the read head includes a magnetic sensor element and shields, yokes for the shields being canted to allow the read head to be positioned closer to the write head.

2. The side-by-side read/write head of claim 1, wherein the write head and the read head comprises a stack of thin films disposed on an undercoat, wherein the first pole tip is disposed at the bottom of the thin film stack.

3. The side-by-side read/write head of claim 2, wherein the write head and the read head further comprise:
   a first shield layer juxtaposed to a first pole layer;

a first insulation layer is formed over the first shield layer and a second insulating layer is formed over the first pole layer; and a second shield layer formed over the first insulating layer and a pedestal layer formed over the second insulation layer.

4. The side-by-side read/write head of claim 3, wherein the first shield layer juxtaposed to the first pole layer further comprises a first isolation layer separating the first shield layer and the first pole layer.

5. The side-by-side read/write head of claim 3, wherein the second shield layer juxtaposed to the pedestal layer further comprises a second isolation layer separating the second shield layer and the pedestal layer.

6. The side-by-side read/write head of claim 3 further comprising leads formed over the first insulating layer and a write coil formed over the second insulating layer simultaneously.

7. The side-by-side read/write head of claim 3, wherein the first isolation layer has a fixed distance between the first shield layer and the first pole layer and the second isolation layer has a fixed distance between second shield layer and the pedestal layer.

8. The side-by-side read/write head of claim 3 further comprising a sensor element between the first and the second shield.

9. The side-by-side read/write head of claim 3, wherein the first pole layer has a central axis and the first pole tip is offset from the central axis towards the sensor element to provide closer track alignment.

10. A magnetic storage system, comprising:
a moveable magnetic storage medium;
an actuator; and
a side-by-side read/write head coupled to the actuator, wherein the write head includes a first layer having a first pole tip that defines a width of a written track and the read head includes a magnetic sensor element and shields, yokes for the shields being canted to allow the read head to be positioned closer to the write head.

11. The system of claim 10, wherein the write head and the read head comprises a stack of thin films disposed on an undercoat, wherein the first pole tip is disposed at the bottom of the thin film stack.

12. The system of claim 11, wherein write head and the read head further comprise a first shield layer juxtaposed to a first pole layer, the first pole layer having a first pole tip for defining a width of a written track, a first insulation layer is formed over the first shield layer and a second insulating layer is formed over the first pole layer and a second shield layer is formed over the first insulating layer and a pedestal layer is formed over the second insulation layer for forming a read head and a write head structure respectively.

13. The system of claim 11, wherein the first shield layer juxtaposed to the first pole layer further comprises a first isolation layer separating the first shield layer and the first pole layer.

14. The system of claim 11, wherein the second shield layer juxtaposed to the pedestal layer further comprises a second isolation layer separating the second shield layer and the pedestal layer.

15. The system of claim 11 further comprising leads formed over the first insulating layer and a write coil formed over the second insulating layer simultaneously.

16. The system of claim 11, wherein the first isolation layers has a fixed distance between the first shield layer and the first pole layer and the second isolation layers has a fixed distance between second shield layer and the pedestal layer.

17. The system of claim 11 further comprising a sensor element between the first and second shield.

18. The system of claim 11, wherein the first pole layer has a central axis and the first pole tip is offset from the central axis towards the sensor element to provide closer track alignment.

19. A side-by-side read/write head, comprising:
write means and read means formed side-by-side, wherein the write means includes a first means having a first pole means for defining a width of a written track and the read means includes sensor means and shield means for shielding the sensor means, wherein the shield means further includes yoke means for concentrating magnetic flux therebetween, the yoke means being canted to allow the read means to be positioned closer to the write means.

* * * * *